No. 824,147. PATENTED JUNE 26, 1906.
H. N. RIVARD.
CREAM PASTEURIZER AND COOLER.
APPLICATION FILED MAR. 28, 1906.
4 SHEETS—SHEET 4.
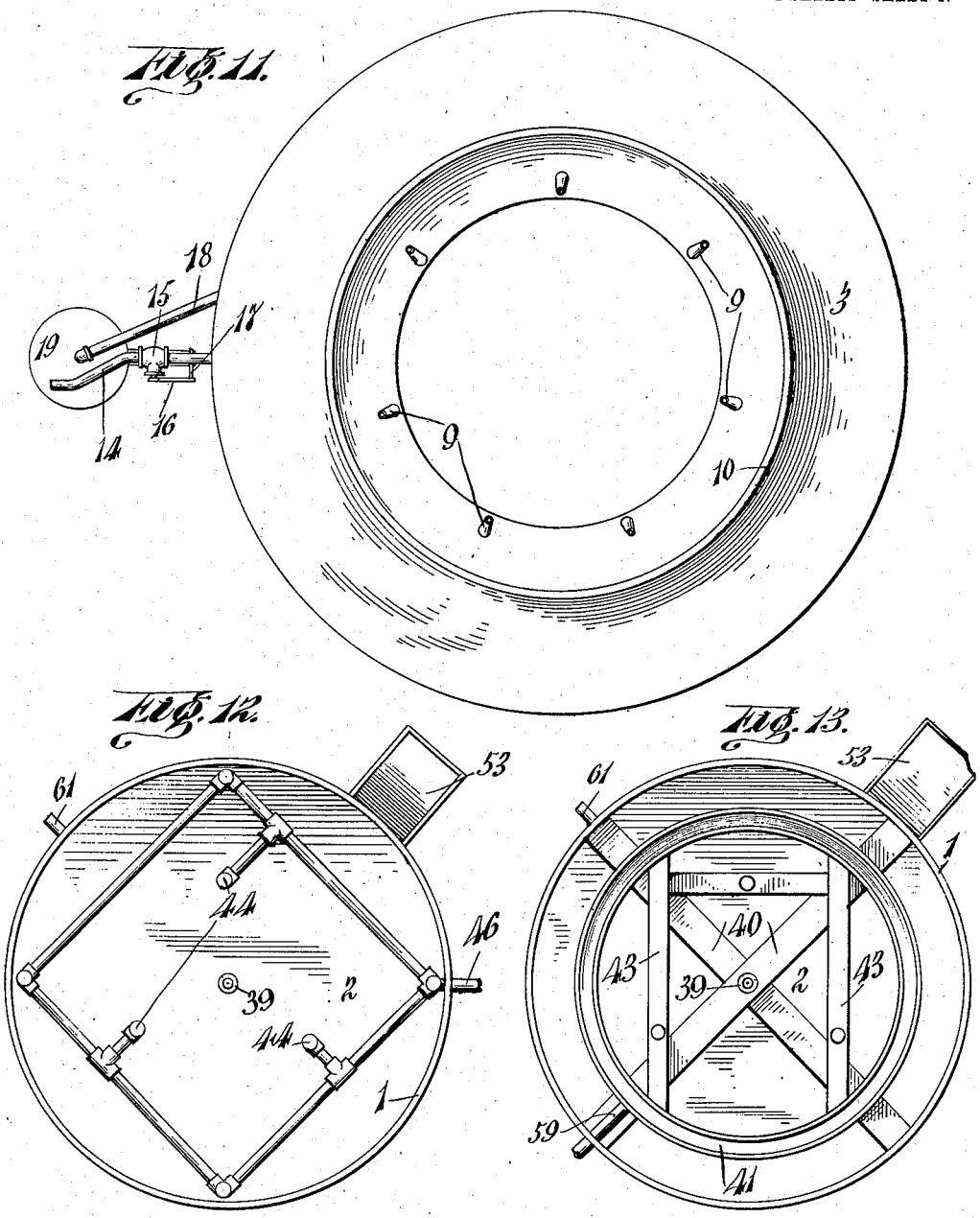
Witnesses:
Hubert N. Rivard.
Inventor,
By Marion & Marion
Attorneys

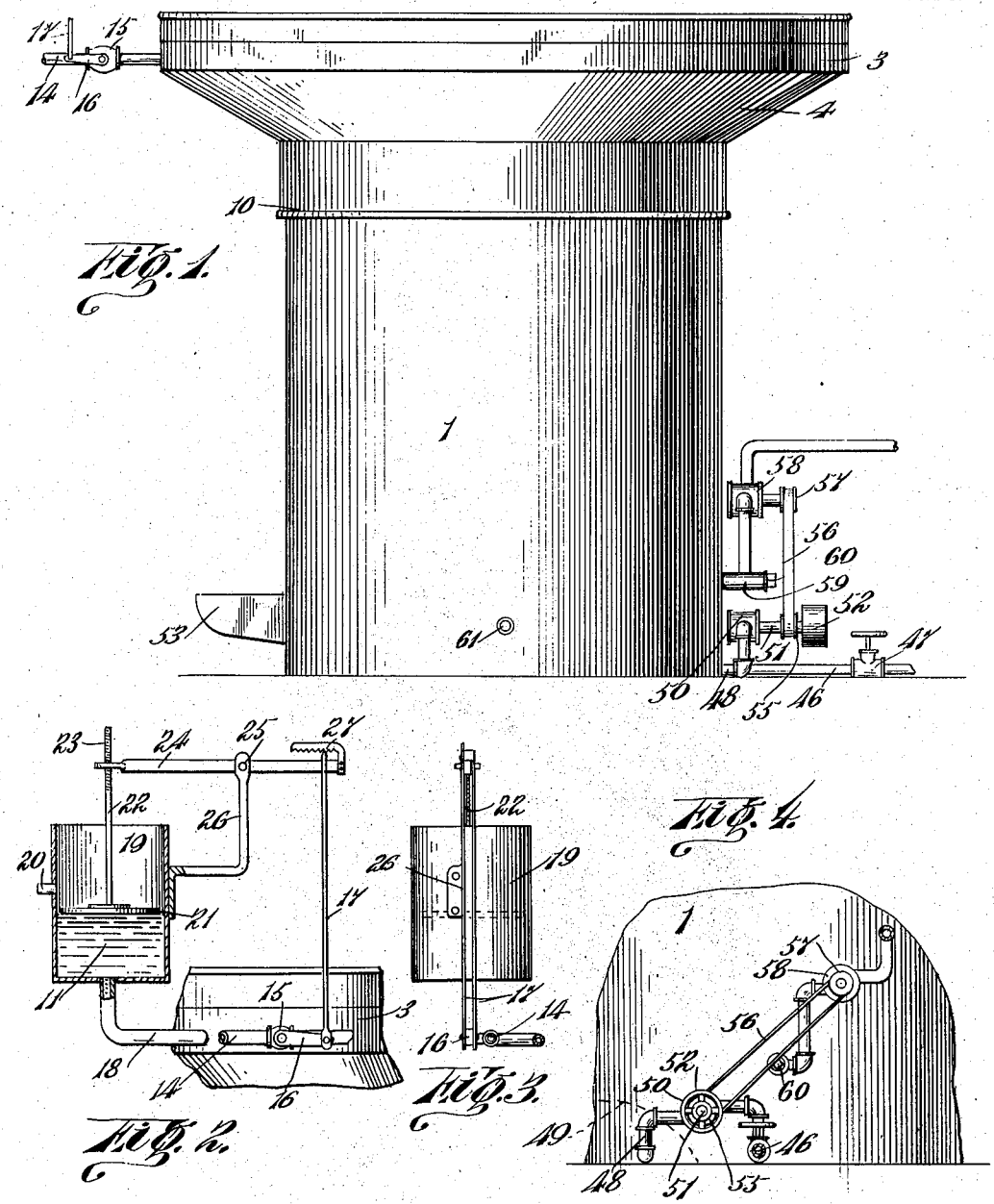

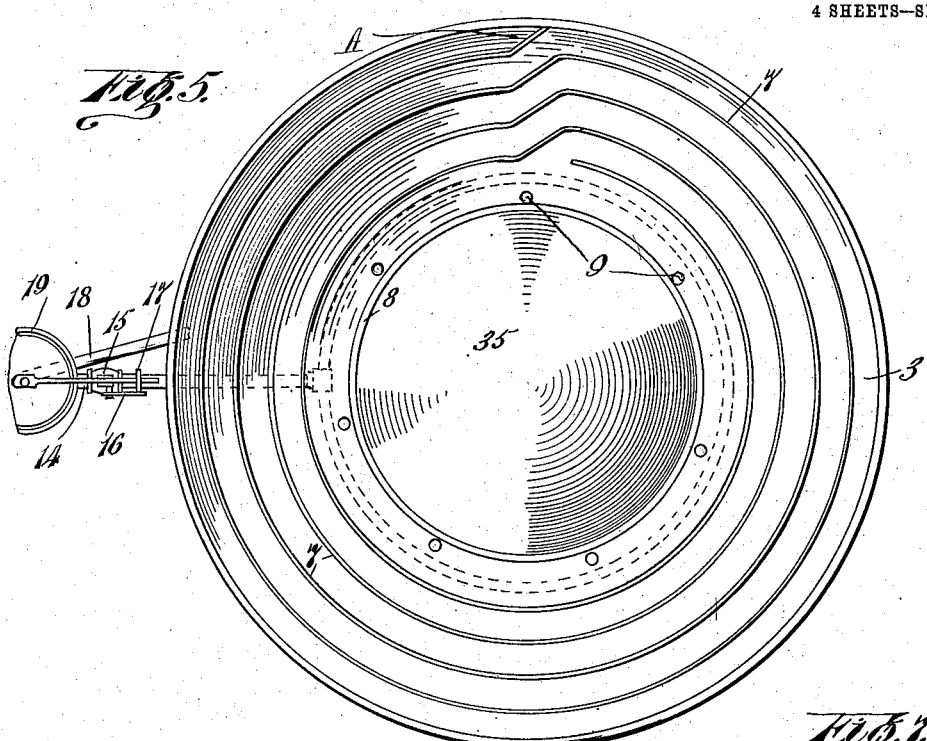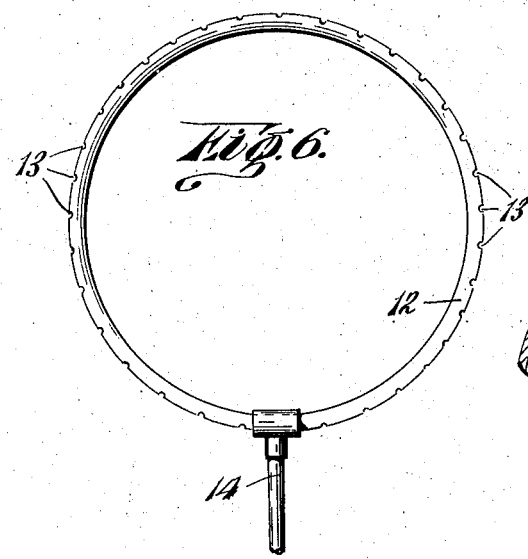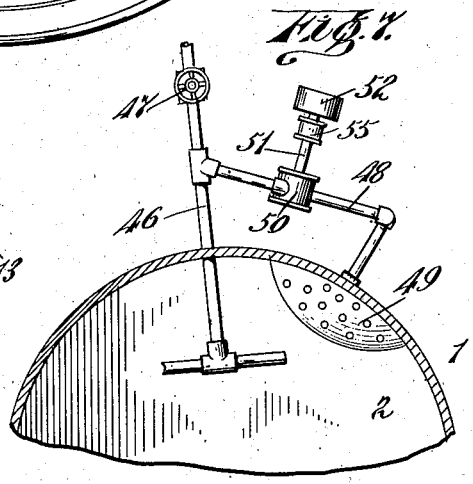

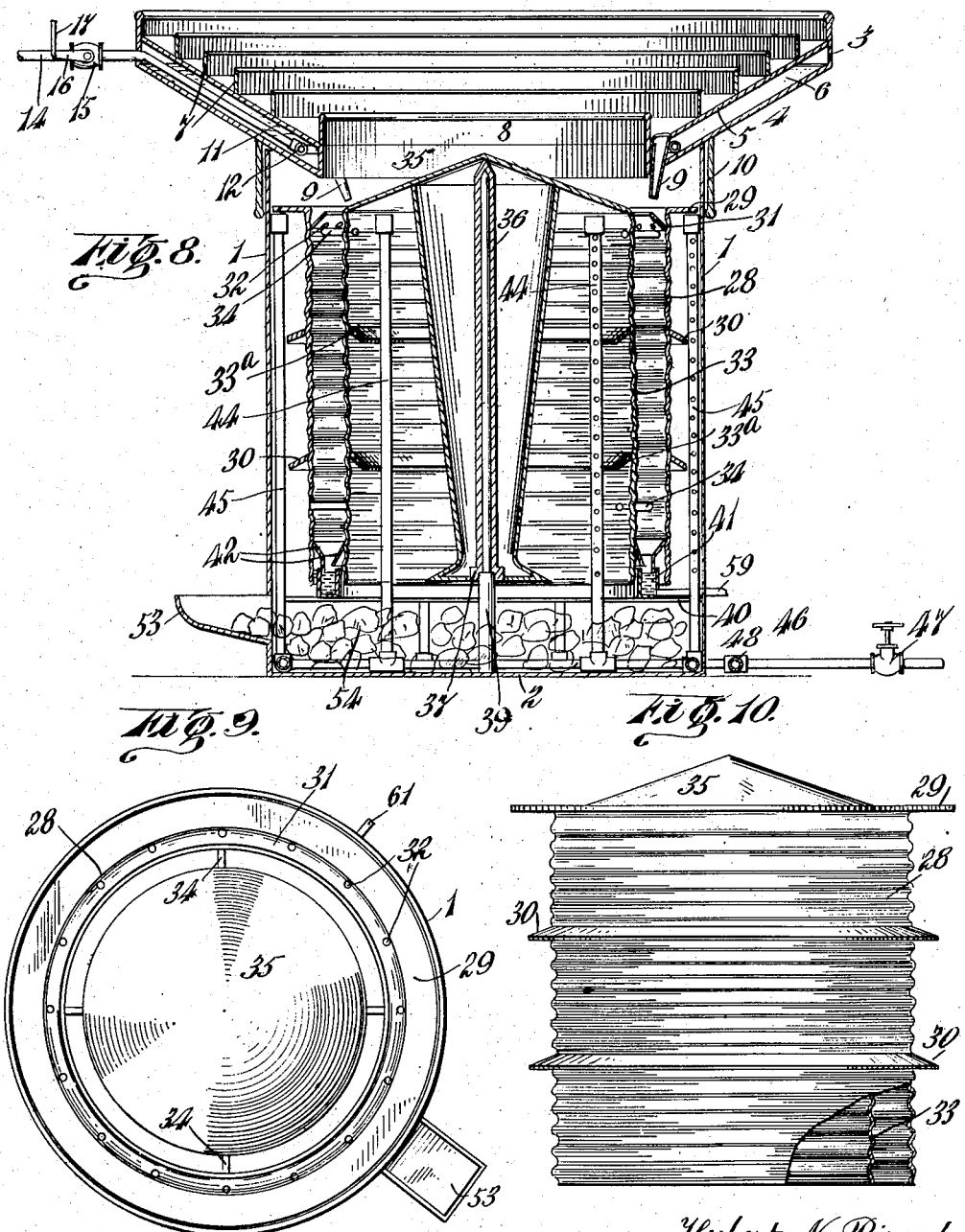

UNITED STATES PATENT OFFICE.

HUBERT N. RIVARD, OF MONTREAL, CANADA, ASSIGNOR TO LA COMPAGNIE DE LAITERIE ST. LAURENT, OF MONTREAL, CANADA, A CORPORATION OF CANADA.

CREAM PASTEURIZER AND COOLER.

No. 824,147.  Specification of Letters Patent.  Patented June 26, 1906.

Application filed March 28, 1906. Serial No. 308,387.

*To all whom it may concern:*

Be it known that I, HUBERT NAPOLEON RIVARD, a subject of the King of Great Britain, residing in the city and district of Montreal, in the Province of Quebec, Canada, have invented certain new and useful Improvements in Cream Pasteurizers and Coolers; and I do hereby declare that the following is a full, clear, and exact description of the invention, such as will enable others skilled in the art to which it appertains to make and use the same.

My invention relates to cream-pasteurizing and cream-cooling apparatus.

The object of my invention is to provide an apparatus in which the cream may be partly evaporated while being pasteurized and while it is constantly circulating to a lower plane.

A further object is to provide means for quickly cooling the cream after it is pasteurized, it being desirable that the cream shall be very quickly cooled.

A further object is to automatically regulate the degree of heat used in the pasteurizer; and my invention consists of the construction, combination, and arrangement of parts, as herein illustrated, described, and claimed.

In the accompanying drawings, forming part of this application, I have illustrated a form of embodiment of my invention, in which drawings similar reference characters designate corresponding parts, and in which—

Figure 1 is a side elevation of the complete apparatus, except the heat-regulating attachment. Fig. 2 is a fragmentary detail of the upper portion of the pasteurizing-drum, showing attached thereto the heat-regulating apparatus, the latter being shown partly in section and partly in elevation. Fig. 3 is a front elevation of the heat-regulating attachment. Fig. 4 is a side elevation of the pumps for pumping the cream and the cooling medium, a fragment of the casing of the pasteurizer being shown in elevation. Fig. 5 is a plan view of the apparatus. Fig. 6 is a plan view of the perforated steam-pipe used for heating the pasteurizing medium. Fig. 7 is a plan view of the water-pumping apparatus, a fragment of the cooling-casing being shown in horizontal section. Fig. 8 is a vertical section through the pasteurizing and cooling casings and their connected parts, some of which are shown in elevation. Fig. 9 is a plan view of the cooling-casing with the pasteurizing-drum removed. Fig. 10 is a side elevation, partly broken away, of the rotatable cooling-casings. Fig. 11 is a bottom plan of the pasteurizing-drum. Fig. 12 is a plan view of the cooling-casing with everything removed except the pipes for supplying the cooling medium. Fig. 13 is a plan view of the cooling-casing, showing the supporting-braces and the cream-receiving trough.

Referring to the drawings, 1 designates a rigid casing provided with a bottom 2. Disposed on the upper edge of the casing 1 is a circular pasteurizing-drum 3, having an inclined circular bottom 4 and a false bottom 5, parallel to the bottom 4, between which is left a continuous passage 6. Carried by the upper surface of the false bottom 5 is a continuous spiral wall 7. Secured to the lower edges of the bottoms 4 and 5 and extending above the upper surface of the bottom 5 is a circular wall or flange 8, adjacent which is disposed a plurality of spouts 9, extending through the bottoms 4 and 5 and having their lower ends staggered with relation to each other for a purpose hereinafter described. Secured to the under surface of the bottom 4 is a circular flange 10, adapted to engage around the upper end of the rigid casing 1 and to maintain the pasteurizing-drum in position. A further object of the flange 10 is to provide a support for the pasteurizing-drum when the same is removed from the rigid casing 1, the flange 10 being of sufficient length to protect the spouts 9 from striking against the floor when the drum is removed from the casing.

A body of water 11 is carried in the passage 6, and a circular steam-pipe 12, having perforations 13, is disposed in the lower portion of said passage. Connected to the pipe 12 is a feed-pipe 14, extending to a suitable source of hot-water supply and provided with a valve 15.

In the operation of the parts so far described the cream is admitted to the pasteurizer at the point A, Fig. 5, and travels around the pasteurizer between the walls 7 until it reaches the spouts 9, where it is discharged. Owing to the inclined surface of the bottom 5, the cream is kept constantly circulating, and the pasteurizer being open-ended a portion of the liquid in the cream is evaporated at the same time that the cream is pasteurized.

Connected to the valve 15 is a handle 16, to which is pivotally secured an upwardly-extending rod 17. Leading from the upper portion of the passage 6 adjacent the feed-pipe 14 is a pipe 18, connecting with and supporting an open-ended casing 19, having a discharge-pipe 20. Disposed in the casing 19 is a float 21, having attached thereto a rod 22, having its upper end provided with screw-threads 23, connected to a lever 24, which is pivoted at 25 to a bracket 26, carried by the casing 19. The upper end of the rod 17 is hooked over the lever 24 and is adjustably maintained in position by means of the corrugated hook 27. (See Fig. 2.) When the heat is sufficient to force the water 11 through the pipe 18 and into the casing 19, the float 21 is raised, causing the rocking of the lever 24 and the consequent movement of the handle 16 to close the valve 15, so that the heat is cut off from the pasteurizer and there is no danger of overheating the cream.

Disposed within the casing 1 is an outer rotatable corrugated casing 28, provided with a horizontal flange 29, extending nearly to the casing 1 and adapted to prevent the passage of water upward, so that it can mix with the cream coming from the pasteurizing-drum. Secured to the outer surface of the member 28 is a plurality of downwardly-inclined flanges 30. The object of this plurality of flanges is that when the cooling medium is thrown against the upper portion of the member 28 such cooling medium will be slightly heated and will run down the sides until it strikes a flange, when such cooling medium will be deflected and will drop entirely to the bottom of the casing, so that the entire surface of the member 28 is rapidly cooled by receiving a fresh supply of the cooling medium continuously.

Secured to the inner surface of the member 28 adjacent its upper end is an upwardly-inclined flange 31, provided with openings 32 to permit the passage of cream. Disposed within the casing 28 is a second corrugated casing 33, connected thereto by means of the braces 34, Fig. 8, and provided with a conical cover 35, from which depends a central bearing 36, provided with shoulders 37. The staggered spouts 9 are adapted to extend, respectively, over the flange 31 and the periphery of the conical cover 35. The cream discharged from the spouts 9 will therefore be evenly distributed on the inner surface of the casing 28 and the outer surface of the casing 33, thereby providing for the rapid cooling of the cream by providing a large surface which is rapidly cooled, as hereinafter described.

Disposed in the bearing 36 is a vertical shaft carried on a pedestal 39, secured to the bottom 2, so that the casings 28 and 33 are free to be rotated, as hereinafter described.

Carried by the lower portion of the casing 1 is a plurality of transverse straps or braces 40, adapted to support a circular trough 41. Secured to the casings 28 and 33 are deflecting flanges 42, adapted to direct the cream into the trough 41.

Carried by the casing 1 are a plurality of supporting-braces 43, supporting the perforated pipes 44, extending upwardly inside of the casing 33, which casing is provided with downwardly-inclined flanges $33^a$, corresponding to the flanges 30 on the outer casing 28. Suitably supported within the casing 1 is a plurality of vertical perforated pipes 45, which are disposed between the wall of the casing 1 and the outer rotatable casing 28, all of said perforated pipes being connected with a suitable feed-pipe 46, having therein a valve 47. The perforations in said pipes are so arranged that a stream of water being pumped therethrough may impinge against the side walls of the casings 28 and 33, so that they are rotated on their supporting-shaft 38.

Leading from the feed-pipe 46 is a short pipe 48, leading back to the bottom of the casing 1, a suitable strainer 49 being used to prevent the passage of solid matter through said pipe, Fig. 7. Connected with the pipe 48 is a pump 50, driven by a shaft 51, having a suitable driving-wheel 52. The casing 1 is provided with a trough 53, by means of which a body of ice 54 may be inserted in the bottom of the casing 1, so that the water pumped through the feed-pipe 46 and into the perforated pipes 44 and 45 may be sufficiently cooled to quickly cool the cream discharged from the pasteurizer, as hereinbefore described.

Secured on the shaft 51 is a belt-pulley 55, Fig. 4, over which is run a belt 56, adapted to actuate a pulley 57 and run the cream-pump 58, disposed in connection with a pipe 59, leading to the cream-receiving trough 41. The pipe 59 is provided with a clean-out 60, through which the cream may be drawn in case of accident to the pump 58. From the pipe 59 the cream is pumped to a suitable place of deposit. The casing 1 is provided with a suitable overflow-pipe 61, Fig. 1, so that the water will not rise above the level of the upper portion of the trough 53.

Having thus fully described my invention, what I claim as new, and desire to secure by Letters Patent, is—

1. In a device of the character described, a drum having an inclined double bottom, a continuous helical wall disposed in the drum, spouts disposed through the double bottom, said bottom being provided with an upwardly-extending flange and provided with a downwardly-extending flange of greater width than the length of said spouts, and means for applying heat to the double bottom.

2. In a device of the character described, a pasteurizing-drum comprising a receptacle having an inclined double bottom provided with discharge-openings, a continuous helical flange carried by the bottom, a perforated pipe disposed between the members of the double bottom, a feed-pipe leading to the perforated pipe, and means for regulating heat applied through the perforated pipe.

3. In a device of the character described, a pasteurizing-drum comprising a receptacle having an inclined double bottom provided with discharge-openings, a continuous helical flange carried by the bottom, a perforated pipe disposed between the members of the double bottom, a feed-pipe leading to the perforated pipe, a valve on the feed-pipe, a handle on the valve, a pipe leading from the double bottom, an open-ended casing carried by the latter pipe and provided with a discharge-opening, a float disposed in the casing, a rod connected to the float, and a connection between the rod and the handle on the valve.

4. In a device of the character described, a pasteurizing-drum comprising a receptacle having an inclined double bottom provided with discharge-openings, a continuous helical flange carried by the bottom, a perforated pipe disposed between the members of the double bottom, a feed-pipe leading to the perforated pipe, a valve on the feed-pipe, a handle on the valve, a pipe leading from the double bottom, an open-ended casing carried by the latter pipe and provided with a discharge-opening, a float disposed in the casing, a rod connected to the float, and provided with a screw-threaded end, a lever connected at one end to the rod, a fulcrum for the lever secured on the casing, and a rod adjustably secured to the opposite end of the lever and to the handle of the valve.

5. In a device of the character described, a supporting-casing, a pasteurizing-drum carried thereby and provided with discharge-openings, a rotatable corrugated casing disposed below the pasteurizer and provided with outer downwardly-inclined flanges and provided with an inner upwardly-inclined perforated flange and provided with a horizontal upper flange, a second casing disposed within the movable casing, braces connecting the two latter casings, a bearing for the second casing, and means for applying a liquid-cooling medium to the casings.

6. In a device of the character described, a supporting-casing, a pasteurizing-drum carried thereby and provided with discharge-openings, a rotatable corrugated casing disposed below the pasteurizer and provided with outer downwardly-inclined flanges and provided with an inner upwardly-inclined perforated flange and provided with a horizontal upper flange, a second casing disposed within the movable casing, braces connecting the two latter casings and provided with a conical cover and a central bearing and provided with inclined downwardly-extending flanges, and a shaft carried by the supporting-casing and inserted in the bearing.

7. In a device of the character described, a supporting-casing, a pasteurizing-drum provided with staggered discharge-spouts and carried by the casing, a plurality of rotatable casings disposed within the supporting-casing and provided with flanges, a trough disposed below the flanges, and means for applying a liquid-cooling medium to both rotatable casings.

8. In a device of the character described, a supporting-casing, a pasteurizing-drum provided with staggered discharge-spouts and carried by the casing, a plurality of rotatable casings disposed within the supporting-casing and provided with flanges, a trough disposed below the flanges, a pump connected with the trough, a clean-out valve on the connection between the pump and the trough, and means for applying a liquid-cooling medium to both rotatable casings.

9. In a device of the character described, a supporting-casing, a pasteurizing-drum disposed on the casing, a pair of rotatable, connected casings disposed within the supporting-casing, a feed-pipe leading from the lower part of the supporting-casing, a valve on the feed-pipe, a pipe leading from the feed-pipe back to the casing, a pump on the latter pipe, a strainer on the latter pipe, and a plurality of perforated pipes connected to the feed-pipe and extending upward inside and outside of the rotatable casings.

10. In a device of the character described, a supporting-casing, a pasteurizing-drum thereon, a pair of rotatable casings disposed within the supporting-casing, an ice-receiving trough projecting from the supporting-casing, means for applying a liquid-cooling medium to the casing, a cream-receiving trough supported adjacent the rotatable casings, and means for removing cream from the trough.

11. In a device of the character described, a supporting-casing, a pasteurizing-drum thereon, a pair of rotatable casings disposed within the supporting-casing, an ice-receiving trough projecting from the supporting-casing, means for applying a liquid-cooling medium to the casing, a cream-receiving trough supported adjacent the rotatable casings, and means for removing cream from the trough comprising a pipe leading to the cream-trough, a pump connected to the pipe, means for driving the pump, and a clean-out on the pipe.

12. In a device of the character described, a supporting-casing, a pasteurizing-drum thereon, a pair of rotatable casings disposed within the supporting-casing, an ice-receiving trough projecting from the supporting-casing, means for applying a liquid-cooling medium in the casing, an overflow-pipe connected to the bottom of the supporting-casing, a cream-receiving trough supported adjacent the rotatable casings, and means for removing cream from the trough.

In witness whereof I have hereunto set my hand in the presence of two witnesses.

HUBERT N. RIVARD.

Witnesses:
E. M. SLINEY,
C. C. COUSINS.